United States Patent [19]

Marino

[11] Patent Number: 5,922,692
[45] Date of Patent: Jul. 13, 1999

[54] CONCENTRATION OF GLYCOSAMINOGLYCANS AND PRECURSORS THERETO IN FOOD PRODUCTS

[76] Inventor: Richard P. Marino, 646 Margo Ave., Long Beach, Calif. 90803

[21] Appl. No.: 09/038,569

[22] Filed: Mar. 11, 1998

[51] Int. Cl.[6] .......................... A61K 31/72; A61K 31/73; A23K 1/00; A23L 1/314
[52] U.S. Cl. .......................... 514/54; 426/516; 426/518; 426/641; 426/644; 426/645; 426/658; 514/62; 536/127
[58] Field of Search .................... 426/641, 644, 426/645, 658, 516, 518; 514/54, 62; 536/124, 127

[56] References Cited

U.S. PATENT DOCUMENTS

| | | | |
|---|---|---|---|
| 4,350,682 | 9/1982 | Balassa | 424/64 |
| 5,229,497 | 7/1993 | Boni | 530/356 |
| 5,364,845 | 11/1994 | Henderson | 514/54 |
| 5,503,990 | 4/1996 | Kurth | 435/68.1 |
| 5,552,176 | 9/1996 | Marino | 426/641 |
| 5,587,363 | 12/1996 | Henderson | 514/54 |
| 5,654,166 | 8/1997 | Kurth | 435/68.1 |

OTHER PUBLICATIONS

Luke R. Bucci, "Nutrition Applied to Injury Rehabilitation and Sports Medicine", CRC Press, Inc. pp. 177–178, 180–203 (1995).

*Primary Examiner*—Howard C. Lee
*Attorney, Agent, or Firm*—Benman & Collins

[57] ABSTRACT

Accordingly, a method is provided for concentrating precursors to vertebrate connective tissue in foodstuffs to be ingested by humans and pets as part of their daily sustenance. The present method comprises the following steps: (a) providing raw vertebrate connective tissue; (b) disintegrating the raw vertebrate connective tissue into an aggregation of particles having a substantially homogenous particle size, preferably via an emulsification process, thereby forming liquefied connective tissue; and (c) thermally processing the liquefied connective tissue, resulting in a readily-edible foodstuff rich in chondroitin sulfates, glucosamine, and other connective tissue building blocks. Also provided herein are foodstuffs resulting from the method as well as foodstuffs comprising vertebrate connective tissue and at least one carrier substrate selected from the group consisting of farinaceous and proteinaceous carriers, with the foodstuffs having chondroitin sulfate and glucosamine concentrations of at least about 0.5 wt % and 0.3 wt %, respectively. Finally, a method of administering precursors to connective tissue is provided herein, comprising providing a foodstuff made from the above-described novel process steps, or having the above-described novel composition, and serving it to a human or pet, thereby representing both daily sustenance and an efficient way to consume therapeutic amounts of chondroitin sulfates, glucosamine, and other building blocks of connective tissue without the need to take pills or tablets.

36 Claims, No Drawings

CONCENTRATION OF GLYCOSAMINOGLYCANS AND PRECURSORS THERETO IN FOOD PRODUCTS

TECHNICAL FIELD

The present invention relates generally to the nutritional use of vertebrate connective tissue, and more particularly, to the concentration of glycosaminoglycans and precursors thereto from vertebrate connective tissue, such as bovine cartilage and connective tissues, in food products to be consumed by humans or pets for daily sustenance.

BACKGROUND ART

The connective tissue of vertebrates includes bone and cartilage as well as tissue that underlies the skin, envelops muscle, and occupies space between internal organs. The primary building blocks of connective tissue are proteoglycans (PG), which are linked to collagen fibers to form connective tissue. Proteoglycan subunits are comprised of glycoaminoglycans (also known as GAGs or mucopolysaccharides) attached in large numbers to a core protein, with these proteoglycan subunits being attached to a very long hyaluronic acid molecule via protein links to form aggregating proteoglycan. GAGs are long-chain polymers with monomer units comprising an aminosugar and an organic acid or sugar. One type of GAG is chondroitin sulfate, which is composed of glucuronic acid and N-acetyl galactosamine sulfate. Glucosamine is a key precursor to both GAGs and hyaluronic acid molecules, which are the primary components of PGs, as discussed above. In fact, the bioavailability of glucosamine is the rate-limiting step in the synthesis of GAGs and PGs.

Connective tissue serves to maintain the structure of the body parts in relation to one another and to cushion the interfaces between bones, among many other purposes. Normal, healthy connective tissue is resilient, compressive, and possessive of a "slippery" type surface, while diseased or damaged connective tissue is rough and brittle. Damage to connective tissue serving to cushion bone interfaces and ease skeletal movement (such as at the knee joint) may actually result in the bones grinding against one another during movement, causing considerable pain and even constraint of movement. Damage to, or disease of, the various types of connective tissues can lead to a variety of adverse effects for humans and pets.

The breakdown of connective tissue in the vertebrate body is a natural occurrence—connective tissue is continuously restored and maintained in a healthy break-down/restoration cycle. In fact, it is reported that GAGs and PGS are continuously restored in connective tissues with an approximately 700 d half life in healthy human joints (L. Bucci, *Nutrition Applied to Injury Rehabilitation and Sports Medicine*, CRC Press, Inc. (1995), p. 177). However, the natural breakdown of connective tissue may be accelerated beyond the rate of restoration due to a wide variety of causes, including disease processes and trauma. Examples of such disease processes include diseases afflicting the joints, such as osteoarthritis, chronic degenerative joint diseases, and autoimmune inflammatory joint diseases; diseases afflicting the bone, such as osteoporosis; and diseases afflicting the skin, such as ulcers. Examples of types of trauma that may accelerate the breakdown of connective tissue include bone fracture, skin burns, and other traumatic injuries.

The bioavailability of glucosamine and GAGs, such as chondroitin sulfate, is believed to bolster the restoration of connective tissue in a variety of ways. For example, glucosamine stimulates the incorporation of other precursors, such as GAGs, PGs, and collagen, into the connective tissue matrix and serves as a precursor to GAG synthesis. Chondroitin sulfate serves to inhibit degradative enzymes and stimulates GAG and PG synthesis in connective tissue cells, particularly chondrocytes (see Bucci, p. 184). The vertebrate body synthesizes GAGs, such as in chondrocytes (cartilage), fibroblasts (skin, ligaments), and osteoblasts (bone).

In addition to self-synthesis of PG and PG precursors, humans and pets ingest a relatively small amount of PGs, GAGs, and glucosamine as part of a normal balanced diet. It is estimated that an average human daily intake of GAGs may approach 1 gram (Id. at 180). It is reported that animals that regularly consume meat have an enhanced ability to digest GAGs compared to those animals that primarily consume vegetation, such as rabbits (Id. at 181). It is also reported that the bioavailability of orally-ingested glucosamines is excellent (Id. at 196).

Extracts of the individual precursors to PGs, such as glucosamine and GAGs like chondroitin sulfates, are available as dietary supplements to increase their bioavailability over that achieved from both self-synthesis and normal dietary ingestion. Glucosamine is available as dietary supplements in the form of glucosamine salts, including glucosamine sulfate, glucosamine.HC1, glucosamine iodide, glucosamine sulfate, and N-acetylglucosamine. Examples of commercially-available glycosaminoglycan supplements include Rumalon® and Arteparon®, which are pharmaceutical preparations available from Robapharm in Basel, Switzerland and Luitpold-Wek in Junich, Germany, respectively. Rumalon is a glycosaminoglycan-peptide complex extracted from bovine bone marrow and cartilage. Arteparon is a glycosaminoglycan polysulfate that is a semisynthetic mixture of GAGs originally prepared from bovine lungs and trachea. Both Rumalon® and Arteparon® are supplied in vials for injections and are not presently administered orally.

Certain dietary supplement compositions are known that offer combinations of PG precursors in extract form. For example, U.S. Pat. No. 5,364,845, issued to Henderson and assigned on its face to Nutramax Laboratories, Inc., discloses a therapeutic composition that includes glucosamine, chondroitin sulfate, and manganese ascorbate in capsule form. U.S. Pat. Nos. 5,503,990 and 5,654,166, issued to Kurth, disclose the preparation of powdered hormone-free bovine cartilage for pharmaceutical cancer treatment and food supplement products, representing another use for connective tissue ingestion aside from connective tissue restoration. According to Bucci, glucosamine salts have shown efficacy of treatment at daily supplemental doses of 1500 mg, divided into two or three doses (see Bucci, p. 202), while daily doses of chondroitin sulfates should be at least 1 gram (Id. at 184). Neither chondroitin sulfates nor glucosamine are believed to be toxic at even much higher levels.

Although the oral ingestion of dietary supplements containing such PG precursors as chondroitin sulfates and glucosamine is known to effectively treat connective tissue disorders, among other maladies, the oral administration of dietary supplements may not be easily accomplished. For example, it can be difficult to orally administer dietary supplements to pets. Moreover, many humans have difficulty in swallowing capsules, or simply dislike taking pills or capsules.

Additionally, dietary supplements can be relatively expensive and complex to manufacture. Presently, dietary supplements containing the building blocks of connective tissue are produced by an extraction process. An example of such an extraction process is disclosed by Kurth (U.S. Pat. No. 5,654,166), wherein bovine tracheal cartilage is subjected to the following steps to achieve extraction: (1) raw bovine tracheal cartilage is first washed, trimmed and cut into small chunks measured in millimeters; (2) the chunks of cartilage are subjected to enzymatic digestion to digest unwanted protein; (3) the lipid fat is removed from the treated cartilage via solvent treatment; and (4) the treated cartilage is reduced to dosage form by pulverization or ball milling. Thus, the extraction process requires several rounds of chemical treatment in addition to size reduction steps to produce a dietary supplement.

In view of the above-described art, a need remains for a manner of oral administration in which therapeutic amounts of chondroitin sulfates, glucosamine, and other useful building blocks of connective tissue, are made available as components of food that will be consumed by humans or pets for daily sustenance, rather than as a dietary supplement. The manner of achieving incorporation of connective tissue precursors into primary dietary foods must necessarily be inexpensive, certainly less so than extraction processes, else the resulting foodstuff would be uneconomical.

DISCLOSURE OF INVENTION

Accordingly, a method is disclosed and recited herein for concentrating precursors to vertebrate connective tissue in foodstuffs to be ingested by humans and pets as part of their daily sustenance. The present method represents a non-extraction process for preparing raw vertebrate connective tissue for incorporation into the primary dietary food of humans and pets. The method comprises: (a) providing raw vertebrate connective tissue; (b) disintegrating the raw vertebrate connective tissue into an aggregation of particles having a substantially homogenous particle size, thereby essentially liquefying the connective tissue; and (c) thermally processing the liquefied connective tissue, resulting in a foodstuff or foodstuff ingredient that is rich in chondroitin sulfates and glucosamine, among other advantageous components found in vertebrate connective tissue.

Additionally, a foodstuff rich in precursors to vertebrate connective tissue, including chondroitin sulfates and glucosamine and its salts, is provided that is made in accordance with the above-disclosed process steps. A foodstuff is also provided comprising: (a) vertebrate connective tissue; and (b) at least one carrier substrate selected from the group consisting of farinaceous and proteinaceous carriers. Importantly, the present foodstuff offers a chondroitin sulfate concentration of at least about 0.5 wt % and a glucosamine concentration of at least about 0.3 wt %, so that a typical one-cup serving of this foodstuff weighing approximately 100 grams offers about 500 mg chondroitin sulfate and about 300 mg glucosamine.

A method of administering precursors to vertebrate connective tissue is also disclosed and recited herein, with the method comprising (a) providing a foodstuff having the above-described novel composition and (b) serving the foodstuff, which is rich in chondroitin sulfates, glucosamnine, and other beneficial connective tissue components, to a human or pet for oral ingestion as part of daily food sustenance. The present method of oral administration represents an efficient way to consume therapeutic amounts of chondroitin sulfates, glucosamine, and other building blocks of connective tissue, and to thereby realize their benefits, without the need to take pills or tablets. For humans and pets averse to ingesting pills or tablets, the present method and food products offer an acceptable and palatable means by which to orally ingest these therapeutic materials.

The present methods and foodstuff overcome the disadvantages described above in connection with the art, namely the expense and complexity of extraction as a means of concentrating connective tissue building blocks for therapeutic ingestion. Further, the present methods and foodstuff enable a human or pet to consume therapeutic amounts of connective tissue building blocks as part of a normal primary diet without resorting to dietary supplements, which may be inconvenient or even difficult to ingest.

BEST MODES FOR CARRYING OUT THE INVENTION

The present invention relates to the incorporation of precursors to vertebrate connective tissue, such as chondroitin sulfates and glucosamine, in foodstuffs to be ingested by humans and pets as part of their daily sustenance. The method comprises: (a) providing raw vertebrate connective tissue; (b) disintegrating the raw vertebrate connective tissue into an aggregation of particles having a substantially homogenous particle size, thereby essentially liquefying the connective tissue, such as by emulsification; and (c) thermally processing the liquefied connective tissue, resulting in a foodstuff or foodstuff ingredient that is rich in connective tissue building blocks, The connective tissue building blocks contained in the resulting foodstuffs offer high nutritional and therapeutic value to both humans and pets without introducing known toxicity or overdose concerns (Bucci, pp. 184, 201).

The raw connective tissue incorporated into the present foodstuffs serves as a rich source of chondroitin sulfates, glucosamine, and other connective tissue building blocks. The raw connective tissue component is obtainable from the slaughter of vertebrates in general. In particular, it is contemplated that raw bovine cartilage will be employed in the practice of the invention, given its economical and availability advantages over other known sources of connective tissue such as shark cartilage and whale nasal septa, although such other sources are suitable for the practice of the invention. A mixture of sources of the raw vertebrate connective tissue may also be employed in the practice of the invention, such as a mixture of raw bovine cartilage with shark cartilage, the latter of which is known to contain a higher concentration of certain GAGs. One skilled in the art would be well capable of optimizing a mixture of raw connective tissue taking into account the cost, availability, and concentration of connective tissue building blocks of various sources of connective tissue.

Bovine cartilage may be readily obtained at the time of butchering of slaughtered cows by separating the cartilaginous parts of the cow from the carcass and then mechanically trimming all adhering tissue therefrom. The harvested cartilaginous parts are then washed and may be refrigerated or frozen pending further processing. The bovine connective tissues that are of primary interest in the practice of the invention include skin, ears, trachea, tendons, and nasal septum, which are all excellent sources of chondroitin sulfates, glucosamine, and other connective tissue precursors. Other bovine body parts that may serve as chondroitin sulfate sources include arterial walls, skeletal tissues, and lungs, among other body parts. The bovine cartilaginous material of greatest availability in terms of quantity are the skin, ears, trachea, and tendons.

Preferably, the bovine cartilage mixture employed in the practice of the invention comprises the following components: (a) 5 to 75 wt % bovine skin; (b) 5 to 50 wt % bovine ears; (c) 5 to 20 wt % bovine trachea; and (d) 5 to 20 wt % bovine tendon, specifically, the backstrap or supraspinous ligament.

Optionally, the present foodstuffs may incorporate supplemental connective tissue building blocks (such as chondroitin sulfates and glucosamine) from sources other than raw vertebrate connective tissue. By so supplementing the connective tissue building blocks, one even further enhances the nutritional value of the resulting foodstuff. One method of supplementing connective tissue precursors would be directly adding the dried isolated forms of the various connective tissue precursors to the foodstuff, such as commercially-available glucosamine salts and chondroitin sulfates in powder form. Another method would be adding the exoskeletons of invertebrates, such as chitosan (or chitan) found in the exoskeletons of crustaceans such as shrimp. However, it is noted that chitan/chitosan require expensive chemical modification before incorporation into foodstuffs, such as deacetylation and N-acylation. Any such necessary chemical modification of the supplemental sources of connective tissue precursors may be accomplished by conventional techniques and forms no part of the present invention.

In addition to the raw connective tissue, a palatability component may be employed in the present foodstuffs and is preferred in the event the foodstuff is intended for direct consumption as a finished food product, as opposed to an ingredient in other food products. The palatability component may be combined with the raw connective tissue, and emulsified therewith, to render the mixture more palatable to the human or pet ultimately consuming the finished foodstuff. For pet food, the palatability component is contemplated to be meat-based. Examples of meat-based palatability additives include, but are not limited to, beef, horse, pork, lamb, poultry, fish, venison and other wild game, offal thereof, and other by-products thereof. It is preferred that a meatbased palatability ingredient comprise up to 30 wt % of the mixture comprising raw connective tissue and the palatability component, with the entire mixture being emulsified at once. Most preferably, the additional meat-based component will comprise bovine liver at about 10 wt % of a bovine cartilage/palatability component mixture. The combination of bovine cartilaginous material with bovine liver provides a palatable matrix that is easily incorporated into a food processing technique such as extrusion processing or baking.

In addition to improved palatability, a meat-based palatability component of the present chondroitin-sulfate enriched pet foods provides an additional source of protein to that offered by the cartilaginous material. The protein component of cartilaginous material is not completely bioavailable to a pet, so that the inclusion of additional protein sources may be required in a finished pet food to meet complete nutritional needs. Additional protein sources may take the form of proteinaceous carrier materials as well as a proteinaceous palatability component. Alternatively, the level of raw connective tissue used to prepare the food product may be reduced to optimize protein availability, with the food product still being capable of delivering appreciable levels of chondroitin sulfates and glucosamines to the pet. It is noted that nutrient profiles, including protein requirements, for pets and various animals are readily available from the Association of American Feed Control Officials, Inc. ("AAFCO") so that one having ordinary skill in the art would be well capable of formulating a finished pet food product in accordance with the invention that would satisfy established protein requirements.

For human food, it is preferred that the raw bovine cartilage additionally comprise a palatability component comprising up to 30 wt % of a non-meat, sugar-based additive, such as fruit pastes, juices, concentrates, and other ingredients common for processing food bars, granola bars, nutrition bars, or products of similar character. Essentially, it is contemplated that the non-meat additive replaces the meat-based additive in pet foods to achieve palatability to humans. It is noted that, for human food, the connective tissue is steam cleaned prior to mixing with the palatability component. Moreover, a non-meat additive may not require emulsification along with the raw connective tissue, but may possibly simply be added to the emulsified tissue prior to thermal processing.

In the practice of the invention, the raw connective tissue, together with a meat-based palatability component, must first be processed to achieve an appropriate texture and particle size. Essentially, the raw connective tissue must be liquefied into an aggregation of substantially homogenous particles to enhance the solubility of the connective tissue precursors, namely GAG's and glycosamine, thereby rendering the precursors sufficiently bioavailable upon ingestion by a human or pet. Any conventional means may be used to sufficiently disintegrate the raw connective tissue, although it is specifically contemplated and preferred that the raw connective tissue be emulsified. As described in more detail below, certain preliminary steps are taken to prepare the raw connective tissue for emulsification, namely sufficiently reducing and homogenizing the particle size of the tissue and adjusting its moisture level to proper levels for emulsification. Preferably, the particle sizes of the raw connective tissue substantially fall within the range of about three-eighths (3/8) to one-half (1/2) inch, and most preferably one-quarter (1/4) inch, in preparation for emulsification, while the moisture level is preferably within the range of about 73 to 77 wt %.

Any conventional means may be employed to reduce and homogenize the particle size of the raw connective tissue and adjust its moisture level as prerequisites to emulsification. Toward that end, it is contemplated that the raw connective tissue is first independently ground, preferably using a meat grinder such as the Weiler Grinder, which is commercially available from Weiler & Company, Inc. of Whitewater, Wis. It is noted that the temperature of the raw connective tissue prior to being ground is typically within the range of about 28° to 35° F., although the material may be ground at room temperature when fresh and then held in cool storage pending further processing. Most preferably, the raw connective tissue is ground using a 1/4 inch face plate.

After an initial particle size reduction and homogenization is accomplished, the raw connective tissue is preferably conveyed to commercial equipment capable of uniformly chopping and mixing the matrix, as well as adjusting the moisture level of the matrix for pumping and handling. An example of the commercial equipment that may be so employed includes the Bowl Cutter, which is commercially available as Model 200 from Fastosa, S.A., Spain. Typically, the Bowl Cutter is charged with about 1600 to 1800 pounds of connective tissue at a time, with the raw connective tissue being processed for about four to five minutes therein. At the completion of the cycle, the processed matrix is discharged and may be pumped into portable holding bins with bottom discharge valves. It is typical in the practice of the invention for the holding bins to contain about 2,000 pounds of raw connective tissue matrix.

The emulsification of the raw connective tissue may be accomplished by any conventional means employed in the art. It is contemplated that uniformly sized and sufficiently moist connective tissue will be conveyed to a mechanical emulsifier for emulsification and final size reduction prior to thermal processing and shaping, such as via extrusion. Specifically, it is contemplated that the bottom valves on the holding bins are opened and the material is gravametrically emptied into the hopper above the emulsifier. In the preferred practice of the invention, a mechanical emulsifier such as the Griffith Mince Master (namely, Model No. 225-100FD from Griffith of Chicago, Ill.) is employed with a double grind face plate for staged size reduction and efficiency, with the plates through which the material is passed preferably being 5 mm and then 2 mm plates. It is noted that the emulsification process (i.e., the achievement of a liquedized state) is critical to the ultimate solubility, and thus bioavailability, of the connective tissue precursors, such as GAGs and glucosamine.

The emulsified raw connective tissue and palatability component mixture is then thermally processed to achieve a properly cooked product using conventional food processing techniques—hondroitin sulfates and glucosamines are known to be heat stable and thus substantially retain their nutritional character throughout conventional thermal processing. For example, the emulsified material may be form or sheet dried in a conventional dryer/dehydrator, much like drying or dehydrating meat in the preparation of jerky. The dehydration process for meat is typically conducted at about 180° F. for a time period within the range of about 10 to 14 hours, with a target final moisture level being within the range of about 10 to 30 wt %. Examples of other conventional food processing techniques that may be employed to cook the emulsified raw connective tissue include, but are not limited to, baking and spray drying. The resulting cooked material may either be directly consumed or, alternatively, may be ground into a powder for use as an ingredient in other foods.

Any conventional food processing technique may be used to achieve a properly cooked product. There is much information on the art and technology of the various conventional food processing techniques and their practices in both the pet food and food industries, and it is accordingly assumed that the general principals of these techniques are understood by the person skilled in the art.

The choice of the method by which the raw connective tissue is thermally processed, and the selection of the types of foodstuffs that may be prepared from the raw connective tissue, may be greatly expanded if a carrier material is employed in the practice of the invention. With the addition of a carrier material to the raw connective tissue, the method of thermally processing the raw connective tissue is not limited to simple baking or dehydration, but may also include such techniques as extrusion processing, coextruding, and canning. Additionally, the process by which granola bars and food bars are prepared may be used to prepare the present foodstuffs. Thus, various types of food products may be produced in the practice of the invention in addition to jerky-type products or powder ingredients for finished foods. For example, foodstuffs produced in the practice of the invention include dry pet foods that serve as a complete nutritional diet for pets, as well as biscuits and treats for pets. Additionally, the present foodstuffs may be formed into cereals, snacks, and nutrition bars for humans. Regardless of the method by which the present foodstuffs are prepared or the components therein, it is preferred that the resulting foodstuffs will provide a chondroitin sulfate concentration of at least about 0.5 wt % and a glucosamine concentration of at least about 0.3 wt %.

In the practice of the invention, the carrier material is contemplated to be a dry material of proteinaceous or farinaceous character. Nonexclusive examples of suitable carrier materials include: dried bakery product (see U.S. Pat. No. 5,552,176, issued to the same inventor as the present invention), the flours of wheat, rice, oat, corn, and soy; the brans of wheat, rice, oat, and corn; wheat middlings; whole ground wheat, corn gluten meal, whole ground corn, soybean meal, barley, sorghum, meat and bone meals, poultry meal, fish meal, dry dog food, and the like of the various materials that typify conventional commercial and premium pet food products.

As an example, the composition below represents typical results when a typical dry pet food formulation is employed as a carrier material in the practice of the invention, with connective tissue being incorporated therein per the method described in Example 1 below:

Ground Corn 10 to 30 wt %
Wheat Flour 10 to 30 wt %
Soybean Meal 5 to 25 wt %
Corn Gluten Meal 5 to 25 wt %
Poultry Meal 5 to 30 wt %
Wheat Middlings 3 to 15 wt %
Vitamin/Mineral Premix 0.5 to 4.5 wt %
Salt 0.25 to 1.0 wt %
Fat 0.5 to 8.0 wt %
Meat or Cartilage Mix 0.5 to 55 wt %.

The ratio of raw connective tissue to carrier material employed in the food mixture may vary depending upon the product type, taste preferences, and process limitations.

In addition to the above-described components, up to about 2 wt % of the unprocessed mixture (i.e., uncooked mixture) may include one or more of the inorganic carriers commonly used in food preparation, such as silica, calcium carbonate, sodium bicarbonate, calcium citrate, and the like. Such inorganic carriers are used for water absorption (for high water-content meats) and/or for adjusting pH.

It is contemplated that the emulsified ingredients (namely, the raw connective tissue and the meat-based palatability component) will be combined with the remaining ingredients (namely, the carrier material, inorganic carriers, dried supplemental connective tissue precursors, and certain palatability components) into a single raw mixture via mechanical mixing prior to thermal processing. It is noted that care must be taken to ensure that the carrier material and any other components for the present foodstuff have an appropriate particle size and texture prior to combination with the emulsified ingredients-certain carrier materials may require grinding to an appropriate texture, as one skilled in the art would readily understand. Mixing may be accomplished by any conventional means employed in the food processing industry, so long as the resulting mixture is thoroughly and homogeneously blended. For example, the components of the foodstuff may be pumped directly into the mixing cylinder (or preconditioner) of the extruder equipment for mixing. Alternatively, mixing may be accomplished in a conventional, low shear, ribbon-type blender (for batch processing) or in a conventional twin paddle high speed blender (for continuous processing).

The thoroughly-mixed components are then thermally processed to cook the raw mixture. As explained above, one may employ drying/dehydration or baking to thermally process the raw mixture. Alternatively, one type of conventional food processing technique that is contemplated for use in the practice of the invention is extrusion processing. The extrusion process offers much flexibility in processing raw connective tissue, such as bovine cartilage, at varying amounts in a formulation. In extrusion, raw mixtures are processed under high pressure and temperature and are forced through a restricted orifice, resulting in a cooked gelatinized pet food product.

In an extrusion process, the emulsified raw connective tissue material, such as raw bovine cartilage, would be added to a cooker type extruder. Although the material may be added to the extruder system directly, it is contemplated that it will likely be added through a mixing cylinder (i.e., preconditioner), where it is blended with dry carrier ingredients to the desired level of connective tissue content. Once the components are thoroughly mixed in the preconditioner, the mixture is typically heated via direct steam injection to a temperature within the range of about 180 to 210° F. The heated matrix is then directly fed into the cooker extruder, where pressure, steam injection, and additional water (if necessary) are used to cook the matrix. Following the cooker extruder step, the cooked matrix is then sized and cut at the die where there is a pressure drop. The extrusion can be conducted under a variety of pressure conditions, depending upon the product type.

High pressure extrusion is typically conducted within the range of about 400 to 2,000 psi. High pressure extrusion is typically employed to produce food products that contain expandable components, such as starch or a starch/protein mixture (e.g., wheat flour, corn flour, and soy flour). When exposed to high pressure and temperature conditions, such foods expand and then develop into cellular extrudate as a result of the large pressure drop. Examples of such food products include breakfast cereal, direct expanded snacks, dry expanded pet food and the like.

Low pressure extrusion is typically conducted within the range of about 50 to 400 psi. Low pressure extrusion is typically employed for products in which densification, rather than expansion, is desirable. Examples of such food products include soft moist pet food, pastas, food bars, and similar products.

Instead of using the extrusion process to both cook and shape the desired foodstuff, the mixture of raw connective tissue and carrier material may be completely cooked then extruded to obtain a final definitive shape, followed by cooling, or drying, baking or toasting, either singularly or in any combination to achieve the desired end food product. It is noted that if the raw bovine cartilage levels exceed about 40 wt % of the total uncooked formulation in the practice of the invention, a twin screw extruder should be employed rather than a single screw extruder because of its positive displacement design.

In an alternative to the above-described extrusion techniques, conventional rotary die extrusion systems such as typically used to make granola bars may be employed to process the mixture of raw connective tissue, carrier component, and palatability component into a nutrition bar for human consumption. Further, a co-extrusion process could be used to make fruit-filled bars where the filling would be thermally processed and combined with filling ingredients typifying such a product.

In an extrusion process, it is preferred that the cartilaginous material be delivered to the extrusion system by a pump at a concentration within the range of about 2 to 40 wt % of the total material. Most preferably, the emulsified mixture of cartilaginous material and palatability component is introduced into the extrusion system at a concentration of about 25 wt % of the total material, with the remaining 75 wt % representing the proteinaceous and farinaceous carrier material, and other additives. In the case of pet food, the material introduced into the extrusion system preferably comprises 25 wt % of the bovine connective tissue and cartilage mixture described above (about 10% of which comprises the palatability component bovine liver) and 75 wt % dry ingredients as the carrier material.

In an alternative to extrusion processing, the mixture of raw connective tissue, carrier material, palatability component, and other additives may be cooked in a baking process. The baking process offers the capability of preparing dough-based shaped products. More specifically, if a baking process is employed, the raw connective tissue can be incorporated into a dough-based carrier material, rotary-molded into the desired shape (i.e., a bone, biscuit, nugget, etc.), baked, and, optionally, dried.

In addition to the extrusion processes and baking processes described above, another conventional means to prepare the mixture of raw connective tissue and carrier material is a dehydration process similar to that employed to make jerky products or similarly dried meat products. Such dehydration processes would involve grinding the "carrier meat", mixing the ground meat with raw connective tissue in amounts reflective of the intended formulation, emulsifying the mixture, and then employing conventional dehydration techniques used to make jerky. It is noted that the carrier material for the raw connective tissue in a dehydration process is actually ground meat. Thus, in this instance, the carrier material and the palatability component are one and the same.

Another process that may be employed to prepare a food that is rich in connective tissue is canning, such as for canned pet foods and canned soups for humans. However, there would be no dehydration of the foodstuff, so that the connective tissue building blocks are not farther concentrated in the foodstuffs by moisture removal. At any rate, a canned mixture of raw connective tissue, such as bovine cartilage, and other carrier products such as various meats, would provide natural levels of chondroitin sulfates, albeit at a lower concentration than achievable by the above techniques in which moisture removal occurs.

Following an extrusion process, and any other food processing technique resulting in dry foodstuffs as opposed to canned foodstuffs, it will typically be desired to reduce the moisture content of the food product. A conventional dryer, such as a rotary dryer, may be used to dry the food product. Whereas the moisture content of the extruded food product is typically within the range of about 18 to 30 wt %, and preferably about 25 wt %, the final food product should typically have a moisture content within the range of about 5 to 12 wt %, and most preferably about 10 wt %.

The foodstuff produced in the practice of the invention may take any form that is edible by humans or pets, including a complete and balanced pet food; a dry or semi-dry product that is an additive for pet food or human food; or granola-type bars, nutrition bars or other snacks for humans. Specifically, if the foodstuff comprises raw connective tissue without a palatability component, it is contemplated that it will be employed as an ingredient to be incorporated into another foodstuff. Toward that end, the thermally processed raw connective tissue is preferably pulverized and ground into a powder or fine meal that may then serve as an ingredient to other foods. Examples of foodstuffs contemplated for human consumption that may include, as an ingredient, connective tissue processed in accordance with the invention include fillings or puddings (similar to gelatins and Jello® products), as well as performance foods in liquid gel form and canned soups.

Alternatively, if the foodstuff prepared in the practice of the invention comprises a palatability component, it is contemplated that the thermally processed mixture may also serve as readily-edible food product for humans or pets. Nonexclusive examples of types of pet foods that may be prepared in the practice of the invention include complete nutritional dry pet foods; pet treats such as biscuits and jerky-type dog treats; canned pet foods; soft moist pet foods; and any other conceivable foodstuff for consumption by pets. Additionally, the present foodstuffs may be prepared for ingestion by humans in the form of cereals and various types of snacks and treats, such as nutritional or granola bars, as well as canned soups.

Regardless of the components or form of the finished foodstuff, it may be stabilized with a conventional anti-oxidant to stabilize any fat contained therein. Examples of such anti-oxidants include BHA, BHT, ethoxyquin, mixed tecopherols (Vitamin E), and the like.

The present foodstuffs prepared in the practice of the invention offer a concentrated source of connective tissue precursors, such as chondroitin sulfate and glucosamine, in the form of the daily sustenance of a human or pet. By orally ingesting the present foodstuffs, a human or pet may readily obtain recommended therapeutic amounts of connective tissue precursors without resorting to swallowing pills, tablets, or capsules. To illustrate, a dry pet food made in accordance with the invention that contains 0.5 wt % chondroitin sulfate and 0.3 wt % glucosamine would contain 500 mg of chondroitin sulfate and 300 mg of glucosamine, which is exceeds the recommended therapeutic daily amount of chondroitin sulfate, in a single cup of pet food weighing approximately 100 g. Moreover, the present foodstuffs offer a much less expensive source of connective tissue components than extracted supplements available from nutritional retail stores and the like.

The following examples illustrate the present method of concentrating connective tissue precursors in foodstuffs, the foodstuffs resulting from the practice of the present method, and the benefits achievable therewith. As one skilled in the art will understand, the Examples are meant merely to show particular applications of the present methods and foodstuffs and are not intended to limit the scope of the present methods and foodstuffs.

EXAMPLES

The following examples illustrate the efficacy by which building blocks of connective tissue, such as, chondroitin sulfates and glucosamine, may be incorporated into pet food per se and pet food ingredients.

Example 1

A pet food was manufactured as follows using extrusion processing. It will be clear to one having ordinary skill in the art that the method of the invention is not limited to extrusion processing, but extends to any food processing technique that offers a means to concentrate the connective tissue building blocks in a food product.

The pet food manufactured in the present example represented a processed mixture of raw bovine cartilage and connective tissue combined with a carrier material comprising a standard dog food formulation. The standard dog food formulation employed in this example was Garth Merricks Beef'n More Brand Dog Food™ and had a composition reported on the packaging comprising (a) a minimum of about 27 wt % protein; (b) a minimum of about 12 wt % fat; (c) a maximum of about 10 wt % moisture; and (d) a maximum of about 3.5 wt % fiber.

A mixture of bovine cartilage/connective tissue and bovine liver was provided having the following composition: (a) about 50 wt % bovine skin: (b) about 30 wt % bovine ears; (c) about 5 wt % bovine trachea; (d) about 5 wt % bovine tendon from backstrap; and (e) about 10 wt % bovine liver. This mixture yielded the following analytical profile:

Moisture 78 wt %
Protein 20 wt %
Fat 1.4 wt %
Ash 0.5 wt %
Chondroitin sulfate 0.36 wt %
Glucosamine 0.074 wt %.

The above-described mixture of bovine cartilage/connective tissue and bovine liver, with the exception of the skin, was ground through a Weiler meat grinder using a ¼-inch face plate, with the ground material being collected in a collection hopper. The skin was a byproduct from the skinning process, which is typically conducted for other purposes such as leather goods or pet chew toys, and was cut and sized by hand rather than ground. The ground material, along with the skin pieces, was stored in a portable bin at a temperature of about 42° F. awaiting emulsification. It is noted that such ground material might also have been stored in its frozen state in 30- to 50-lb. blocks until required for future production. The ground bovine material was then mechanically emulsified using a Griffith Mince Master, Model No. 225-100FD, with the ground material being passed through two grinder plates, namely an initial 5 mm plate and a final 2 mm plate.

The emulsified mixture of bovine cartilage/connective tissue and bovine liver was fed into an extrusion system via slurry pumping at a rate of about 3,250 lbs./hr., while the carrier material of dry dog food was fed into the system at a rate of about 10,400 lbs./hr. Thus, the emulsified mixture of connective tissue and palatability component was delivered to the extrusion system at a rate nearing about 25 wt % of the total formulation. The extrusion system employed was an Extru-Tech 750 single screw cooker extruder manufactured by Extru-Tech, Inc. of Sabetha, Kans.

The extruder system then mixed, heated, cooked, formed, and shaped the material into a thermally-processed, readily-edible foodstuff for pets. Specifically, the material first underwent a preconditioning cycle wherein the emulsified material was mixed and blended with the dry pet food carrier material. Steam was then directly applied to the mixture to raise the temperature of the blended materials to a temperature within the range of about 190° to 210° F. for a period of about 75 seconds prior to delivery to the extruder proper. The heated materials were then cooked in the extruder, wherein pressure within the range of about 400 to 800 psi was employed to cook the materials to a temperature above the boiling point of water. The materials then exited the extruder system through a restricted orifice, whereupon their transition from a high pressure environment to a low pressure environment caused the instantaneous expansion of the cooked mixture. The product was then shaped by a die and cut for size by a high speed rotating knife. The moisture content of the extruded and sized material was about 28 wt % with a density of about 25 lbs./ft$^3$.

The cooked and shaped material was then conveyed to a dryer, namely an Aeroglide Dryer, Model No. G2-84-40RGC. Therein, the moisture level of the extrudate was reduced from about 28 wt % to about 10 wt %, with the final phase of the dryer being a cooling zone through which the resulting pet foodstuff was passed. The density of the resulting pet food was about 24 lbs./ft$^3$.

Finally, the dry pet food product was coated with a topical application of fat with palatability enhancers to ensure pet acceptability and adequate caloric intake. Specifically, the coating was accomplished in a typical coating drum with spray nozzles that applied the liquid coating, with the amount of coating being controlled via pump regulation.

The finished pet food product had the following analytically-determined composition:

Moisture 10.4 wt %
Protein 28.2 wt %
Fat 10.2 wt %
Ash 6.3 wt %
Chondroitin sulfate 0.5 wt %
Glucosamine 0.3 wt %.

The concentration of the chondroitin sulfates and glucosamine was measured in the final pet food product using known gel filtration chromatography and HPLC technologies.

Therefore, this pet food product offers about 5 mg of chondroitin sulfates and about 3 mg of glucosamine per gram of the finished pet food product. It follows that a pet consuming approximately 100 g of this pet food product, or about one cup, would consume about 500 mg chondroitin sulfates and 300 mg of glucosamine. This is in comparison to commercial bovine cartilage supplements containing about 235 to 300 mg of chondroitin sulfates per tablet.

Example 2

An ingredient for pet food was manufactured as follows using extrusion processing as in Example 1, but employing a different carrier material. More particularly, the standard dry dog food carrier material of Example 1 was replaced with a mixture of wheat middlings and rice flour, with the process steps of Example 1 being repeated on the new mixture. As in Example 1, the raw mixture contained 75 wt % carrier and 25 wt % bovine connective tissue/liver material, but in this Example the carrier matenal comprised about 40 wt % wheat middlings and about 35 wt % rice flour instead of 75 wt % standard dry dog food.

The mixture of bovine cartilage/connective tissue and bovine liver was prepared using the same steps described in Example 1. The carrier material and the emulsified mixture were then extruded and dried, again according to the steps employed in Example 1. After the drying step, the pet food product was ground to a flour-like consistency using a hammer mill set up with a 0.0469 inch screen. The flour-like material had the following composition:

Moisture 13.0 wt %
Protein 22.0 wt %
Fat 3.2 wt %
Ash 2.7 wt %
Chondroitin sulfate 0.5 wt %
Glucosamine 0.3 wt %.

This pet food ingredient may be incorporated into other pet food products, such as dried dog or cat food, soft moist dog or cat food, jerky-type dog food treats, dog biscuits, dry dog or cat snacks, and canned dog or cat food.

Example 3

A pet food or ingredient for human or pet food was manufactured via dehydration processing using bovine cartilage and connective tissue without supplementation by a carrier material. The tissue was subjected to meat dehydration processes performed while still in its frozen state.

More specifically, a mixture of bovine cartilage/connective tissue and bovine liver was provided having the following components (which are substantially identical to the mixture of Example 1): (a) about 50 wt % bovine skin: (b) about 30 wt % bovine ears; (c) about 5 wt % bovine trachea; (d) about 5 wt % bovine tendon from backstrap; and (e) about 10 wt % bovine liver. As reported above, this mixture yielded the following analytical profile:

Moisture 78 wt %
Protein 20 wt %
Fat 1.4 wt %
Ash 0.5 wt %
Chondroitin sulfate 0.36 wt %
Glucosamine 0.074 wt %.

The mixture of bovine cartilage/connective tissue and bovine liver was prepared for emulsification according to the steps reported in Example 1 above and then similarly emulsified. The emulsified material was then stuffed into a removable, flexible vinyl casings (non-edible) using a stuffer. It is noted that any type of casing, whether edible or inedible, might have been employed to contain and shape the emulsified material so long as the casing was removable. Moreover, any type of stuffer might have been employed to shape the product into a useful or recognizable shape for consumption, with the usefulness of the shape being related to maximizing its surface area for more efficient drying. In this Example, the stuffer employed was a Risco Bevetti Model 4000 available from Zane, Italy, and three different diameters of casings were stuffed with the emulsified mixture, namely 1-inch, 2-inch, and 3-inch diameter casings. The stuffed casings were then placed into a freezer overnight until frozen solid, whereupon the vinyl casing was removed and discarded. As a result, three frozen tubes of emulsified material were produced, with each having a length of about fifteen (15) inches.

The frozen tubes were then sliced into about ¼-inch thicknesses using a standard butcher style band saw and placed on perforated trays to facilitate drying. The trays containing the sliced, frozen product were placed on a portable rack capable of holding forty (40) such trays, and the rack was placed in a dryer having an operating temperature of about 180° F.

Once the moisture level in the food product was reduced to about 10 wt %, and thereby sufficiently low to inhibit microbiological spoilage, the dried matrix was ground using impact hammer mills. The ground food product could then serve as an ingredient for addition to food for consumption by humans or pets. It is noted that the dehydrated food product need not necessarily be ground, but may be consumed directly by a pet, or if intended for human consumption, could be incorporated into a liquid gel system, flavored, and consumed directly.

It is noted that the process steps described above may be accomplished in a continuous system rather than the batch system employed for this Example, as one having ordinary skill in the art would understand. In such a continuous system, the forming, freezing, slicing, and drying steps could be accomplished by extruding the material onto trays at temperatures near freezing (such as about 28° to 31 ° F.) and then continuously drying the material in spiral- or truck-style dryers. As explained above, any conventional method of meat dehydration may be employed in the practice of the invention.

The finished dried foodstuff had the following analytically-determined composition:

Moisture 10.20 wt %
Protein 82.13 wt %
Fat 5.63 wt %
Ash 1.96 wt %
Chondroitin sulfate 1.40 wt %
Glucosamine 0.3 wt %.

The concentration of the chondroitin sulfates was measured in the final pet food product using known gel filtration chromatography.

Therefore, this pet food product offers about 14 mg of chondroitin sulfate and about 3 mg of glucosamine per gram of the finished food product. It follows that a pet consuming 100 g of this pet food product would consume about 1,400 mg chondroitin sulfates and 300 mg glucosamine. This is in comparison to commercial bovine cartilage supplements containing about 235 to 300 mg of chondroitin sulfates per tablet.

Example 4

An ingredient for pet food was manufactured using a baking process to cook the raw material. A standard dry dog food such as employed in Example 1 was employed as the carrier material in this Example, and the emulsified bovine connective tissue and liver mixture of Example 1 was employed here as well.

In this process, the dry carrier material was added to a conventional commercial dough mixer, namely a dough mixer made commercially available by Nichols of Los Angeles, Calif. Subsequently, the emulsified mixture of cartilaginous material, connective tissue, and palatability component was added to the dry ingredients to represent about 30 wt % of the total mixture, whereupon the components were blended together for about ten (10) minutes at a temperature of about 165° F. until a moldable dough was achieved. Only a very small amount of water was added during the mixing process because the moisture from the cartilaginous mixture and connective tissue (about 78 wt %) was sufficient to develop an adequate dough, with the final moisture content of the dough being about 30 wt %.

The dough was then conveyed by screw aguar to a high speed mixer, namely the high speed mixer commercially available from Scott of New Prague, Minn. as Model No. 1648 HSB, to break up the dough into smaller dough aggregates of uniform consistency. The more homogeneously-sized dough was then fed into a 30-inch rotary die molder commercially available from Weidenmiller of Itasca, Ill. The rotary die molder was employed with a biscuit die having the dimensions 1.75 inch×2.0 inch×0.5 inch with nine 0.31-inch docker pins. The shaped dough exiting the molder was then conveyed to a continuous band oven manufactured by the Browning Oven Company of Wilmington, Calif., whereupon the dough was baked at a temperature of about 500° F. for about eight (8) minutes. The baked biscuits were then conveyed to a Proctor and Schwartz two-pass dryer, where the biscuits were dried at a temperature of about 240° F. for about twenty-two (22) minutes. Finally, the dried and baked biscuits were cooled using a California Pellet Cooler until they reached ambient temperature.

The finished biscuits had the following composition:

Moisture 10.0 wt %
protein 20.0 wt %
Fat 8.0 wt %
Fiber 4.0 wt %
Ash 5.8 wt %
Chondroitin sulfate 0.5 wt %
Glucosamine 0.3 wt %.

Therefore, this pet food product offers about 5 mg of chondroitin sulfates and about 3 mg of glucosamine per gram of the finished pet food product. It follows that a pet consuming approximately 100 g of this pet food product would consume about 500 mg chondroitin sulfates and 300 mg of glucosamine. This is in comparison to commercial bovine cartilage supplements containing about 235 to 300 mg of chondroitin sulfates per tablet.

The biscuits prepared in Example 4 were ready for direct packaging for consumption by a pet. Alternatively, the biscuits could have been crumbled and sized reduced using conventional grinders similar to the Fitz Mill equipped with screens appropriate for the desired size reduction, with the resulting ground material being appropriate for use as an ingredient in pet foods.

Thus, there has been described a method of concentrating precursors to vertebrate connective tissue in foodstuffs for the sustenance of humans and pets as well as foodstuffs for humans and pets that are rich in such precursors to vertebrate connective tissue as chondroitin sulfates and glucosamine. Additionally, a method of administering precursors to vertebrate connective tissues to humans and pets is described herein. It will be apparent to those skilled in the art that various changes and modifications of an obvious nature may be made without departing from the spirit of the invention, and all such changes and modifications are considered to fall within the scope of the invention, as defined by the appended claims.

What is claimed is:

1. A method of concentrating glycosaminoglycans and glucosamine from vertebrate connective tissue in foodstuffs for sustenance of humans and pets, said method comprising:
   (a) providing raw vertebrate connective tissue;
   (b) disintegrating said raw vertebrate connective tissue into an aggregation of particles having a substantially homogenous particle size, thereby forming liquefied connective tissue; and
   (c) thermally processing said liquefied connective tissue, resulting in a foodstuff.

2. The method of claim 1 wherein said raw vertebrate connective tissue is selected from the group consisting of bovine skin, bovine ears, bovine trachea, bovine tendon, bovine nasal septum, bovine arterial walls, bovine skeletal tissues, bovine lungs, and mixtures thereof.

3. The method of claim 2 wherein said raw vertebrate connective tissue comprises (a) about 5 to 75 wt % bovine skin; (b) about 5 to 50 wt % bovine ears; (c) about 5 to 20 wt % bovine trachea; and (d) about 5 to 20 wt % bovine tendon.

4. The method of claim 1 further comprising, after step (a):
   (a') providing a palatability component, and
   (a") mixing said palatability component and said raw vertebrate connective tissue to form a palatable raw mixture, and wherein step (b) comprises disintegrating said palatable raw mixture to form a liquefied palatable raw mixture and wherein step (c) comprises thermally processing said liquefied palatable raw mixture, resulting in said foodstuff.

5. The method of claim 4 wherein said palatability component comprises up to 30 wt % of said palatable raw mixture, said palatability component selected from the group consisting of at least one source of meat and at least one source of sugar.

6. The method of claim 5 wherein said palatability component is bovine liver and comprises about 10 wt % of said palatable raw mixture.

7. The method of claim 4 further comprising, after step (a"):

(a''') providing at least one carrier substrate selected from the group consisting of farinaceous and proteinaceous carriers, and further comprising, after step (b):

(b') mixing said liquefied palatable raw mixture and said at least one carrier substrate to form a final mixture, and wherein step (c) comprises thermally processing said final mixture, resulting in said foodstuff.

8. The method of claim 7 wherein said at least one carrier substrate is selected from the group consisting of dried bakery product, wheat flour, wheat middlings, wheat bran, whole ground wheat, rice flour, rice bran, oat flour, oat bran, corn flour, corn bran, corn gluten meal, whole ground corn, soy flour, soybean meal, barley, sorghum, meat meals, poultry meal, fish meal, dry dog food, and mixtures thereof.

9. The method of claim 1 wherein said raw connective tissue is disintegrated in step (b) by emulsification.

10. The method of claim 1 wherein said liquefied connective tissue is thermally processed in step (c) by a conventional food processing technique selected from the group consisting of extruding, coextruding, baking, drying, dehydrating, and canning.

11. The method of claim 1 further comprising, after step (c):

(d) forming said foodstuff into a shape, and
(e) drying said shaped foodstuff.

12. The method of claim 11 wherein said shaped and dried foodstuff has a moisture content within the range of about 5 to 12 wt %.

13. The method of claim 11 further comprising, after step (e):

(f) grinding said shaped and dried foodstuff into meal or powder to serve as an ingredient to be incorporated into other foodstuffs.

14. A method of concentrating glycosaminoglycans and glucosamine from vertebrate connective tissue in foodstuffs for sustenance of pets, said method comprising:

(a) providing raw bovine connective tissue;
(b) providing a palatability component comprising at least one source of meat;
(c) mixing said raw bovine connective tissue and said palatability component to form a palatable raw mixture;
(d) mechanically emulsifying said palatable raw mixture, thereby forming liquefied mixture;
(e) providing at least one carrier substrate selected from the group consisting of dried bakery product, wheat flour, wheat middlings, wheat bran, whole ground wheat, rice flour, rice bran, oat flour, oat bran, corn flour, corn bran, corn gluten meal, whole ground corn, soy flour, soybean meal, barley, sorghum, meat meals, poultry meal, fish meal, dry dog food, and mixtures thereof;
(f) mixing said liquefied mixture and said at least one carrier substrate to form a final mixture, said liquefied mixture present in said final mixture at a concentration within the range of about 2 to 40 wt %;
(g) extruding said final mixture to form a cooked and shaped mixture; and
(h) drying said cooked and shaped mixture to dehydrate said cooked and shaped mixture to a moisture level within the range of about 5 to 12 wt %, thereby forming a finished pet food product.

15. A foodstuff for the sustenance of humans and pets having a composition rich in glycosaminoglycans and glucosamine from vertebrate connective tissue, said foodstuff prepared by a process comprising the steps of:

(a) providing raw vertebrate connective tissue;
(b) disintegrating said raw vertebrate connective tissue into an aggregation of particles having a substantially homogenous particle size, thereby forming liquefied connective tissue; and
(c) thermally processing said liquefied connective tissue, resulting in said foodstuff.

16. The foodstuff of claim 15 wherein said raw vertebrate connective tissue is selected from the group consisting of bovine skin, bovine ears, bovine trachea, bovine tendon, bovine nasal septum, bovine arterial walls, bovine skeletal tissues, bovine lungs, and mixtures thereof.

17. The foodstuff of claim 16 wherein said raw vertebrate connective tissue comprises (a) about 5 to 75 wt % bovine skin; (b) about 5 to 50 wt % bovine ears; (c) about 5 to 20 wt % bovine trachea; and (d) about 5 to 20 wt % bovine tendon.

18. A foodstuff for the sustenance of humans and pets having a composition rich in glycosaminoglycans and glucosamine from vertebrate connective tissue, said foodstuff comprising:

(a) vertebrate connective tissue; and
(b) at least one carrier substrate selected from the group consisting of farinaceous and proteinaceous carriers; said foodstuff having a chondroitin sulfate concentration of at least about 0.5 wt % and a glucosamine concentration of at least about 0.3 wt %.

19. The foodstuff of claim 18 wherein said vertebrate connective tissue is selected from the group consisting of bovine skin, bovine ears, bovine trachea, bovine tendon, bovine nasal septum, bovine arterial walls, bovine skeletal tissues, bovine lungs, and mixtures thereof.

20. The foodstuff of claim 19 wherein said vertebrate connective tissue comprises (a) about 5 to 75 wt % bovine skin; (b) about 5 to 50 wt % bovine ears; (c) about 5 to 20 wt % bovine trachea; and (d) about 5 to 20 wt % bovine tendon.

21. The foodstuff of claim 18 wherein said at least one carrier substrate is selected from the group consisting of dried bakery product, wheat flour, wheat middlings, wheat bran, whole ground wheat, rice flour, rice bran, oat flour, oat bran, corn flour, corn bran, corn gluten meal, whole ground corn, soy flour, soybean meal, barley, sorghum, meat meals, poultry meal, fish meal, dry dog food, and mixtures thereof.

22. The foodstuff of claim 18 further comprising a palatability component selected from the group consisting of at least one source of meat for foodstuff intended for pets and at least one source of sugar for foodstuff intended for humans.

23. The foodstuff of claim 22 wherein said palatability component comprises bovine liver.

24. The foodstuff of claim 18 wherein said foodstuff has a moisture content within the range of about 5 to 12 wt %.

25. The foodstuff of claim 18 wherein said foodstuff comprises, as a raw mixture before cooking, about 2 to 40 wt % said vertebrate connective tissue and the balance said at least one carrier substrate, and wherein said foodstuff, upon cooking and drying, has a final moisture content within the range of about 5 to 12 wt %.

26. A method of administering glycosaminoglycans and glucosamine from vertebrate connective tissue, said method comprising the steps of:

(a) providing a foodstuff prepared by a process comprising the steps of:
  (i) providing raw vertebrate connective tissue,
  (ii) disintegrating said raw vertebrate connective tissue into an aggregation of particles having a substantially homogenous particle size, thereby forming liquefied connective tissue, and
  (iii) thermally processing said liquefied connective tissue, resulting in a foodstuff; and
(b) serving said foodstuff to a human or pet for oral ingestion as part of daily food sustenance.

27. The method of claim 26 wherein said raw vertebrate connective tissue is selected from group consisting of bovine skin, bovine ears, bovine trachea, bovine tendon, bovine nasal septum, bovine arterial walls, bovine skeletal tissues, bovine lungs, and mixtures thereof.

28. The method of claim 27 wherein said raw vertebrate connective tissue comprises (a) about 5 to 75 wt % bovine skin; (b) about 5 to 50 wt % bovine ears; (c) about 5 to 20 wt % bovine trachea; and (d) about 5 to 20 wt % bovine tendon.

29. The method of claim 26 wherein said foodstuff is in a form selected from the group consisting of a dry complete pet food, soft moist pet foods, canned pet foods, canned soups, pet treats, snacks for humans, nutrition bars, granola-type bars, cereals, puddings, and liquid gels.

30. A method of administering glycosaminoglycans and glucosamine from vertebrate connective tissue to a human or pet, said method comprising the step of:
  (a) providing a foodstuff comprising:
    (i) vertebrate connective tissue, and
    (ii) at least one carrier substrate selected from the group consisting of farinaceous and proteinaceous carriers, said foodstuff having a chondroitin sulfate concentration of at least about 0.5 wt % and a glucosamine concentration of at least about 0.3 wt %; and
  (b) serving said foodstuff to a human or pet for oral ingestion as part of daily food sustenance.

31. The method of claim 30 wherein said raw vertebrate connective tissue is selected from the group consisting of bovine skin, bovine ears, bovine trachea, bovine tendon, bovine nasal septum, bovine arterial walls, bovine skeletal tissues, bovine lungs, and mixtures thereof.

32. The method of claim 31 wherein said raw vertebrate connective tissue comprises (a) about 5 to 75 wt % bovine skin; (b) about 5 to 50 wt % bovine ears; (c) about 5 to 20 wt % bovine trachea; and (d) about 5 to 20 wt % bovine tendon.

33. The method of claim 30 wherein said at least one carrier substrate is selected from the group consisting of dried bakery product, wheat flour, wheat middlings, wheat bran, whole ground wheat, rice flour, rice bran, oat flour, oat bran, corn flour, corn bran, corn gluten meal, whole ground corn, soy flour, soybean meal, barley, sorghum, meat meals, poultry meal, fish meal, dry dog food, and mixtures thereof.

34. The method of claim 30 wherein said foodstuff further comprises a palatability component selected from the group consisting of at least one source of meat for foodstuff intended for pets and at least one source of sugar for foodstuff intended for humans.

35. The method of claim 30 wherein said foodstuff has a moisture content within the range of about 5 to 12 wt %.

36. The method of claim 30 wherein said foodstuff is in a form selected from the group consisting of a dry complete pet food, soft moist pet foods, canned pet foods, canned soups, pet treats, snacks for humans, nutrition bars, granola-type bars, cereals, puddings, and liquid gels.

* * * * *